US012614710B1

(12) United States Patent
Nikawa et al.

(10) Patent No.: US 12,614,710 B1
(45) Date of Patent: Apr. 28, 2026

(54) DISCHARGE LAMP

(71) Applicant: Ushio Denki Kabushiki Kaisha, Tokyo (JP)

(72) Inventors: Shinji Nikawa, Tokyo (JP); Koji Enomoto, Tokyo (JP); Yuki Sakamoto, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/264,023

(22) Filed: Jul. 9, 2025

Related U.S. Application Data

(63) Continuation of application No. 19/169,878, filed on Apr. 3, 2025.

(51) Int. Cl.
*H01J 61/073* (2006.01)
*H01J 61/20* (2006.01)

(52) U.S. Cl.
CPC ........... *H01J 61/0732* (2013.01); *H01J 61/20* (2013.01)

(58) Field of Classification Search
CPC .............................. H01J 61/0732; H01J 61/20
See application file for complete search history.

(56) References Cited

U.S. PATENT DOCUMENTS 5,486,737 A * 1/1996 Hrubowchak ........ H01J 61/302 313/493
7,034,460 B2 * 4/2006 Takahashi ............. H01J 61/073 313/332
2007/0182331 A1 * 8/2007 Haselhorst .......... H01J 61/0732 313/631
2008/0297064 A1 * 12/2008 Fujii ....................... H01J 61/54 313/484

FOREIGN PATENT DOCUMENTS

CN 202473839 U * 10/2012
JP H09-097591 A 4/1997

OTHER PUBLICATIONS

English Machine Translation of Zhou , CN 202473839 (Year: 2025).*

* cited by examiner

*Primary Examiner* — Donald L Raleigh
(74) *Attorney, Agent, or Firm* — Studebaker Brackett PLLC

(57) ABSTRACT

A discharge lamp includes: a pair of electrodes disposed so as to face each other in a single axis direction; a bulb that includes an arc tube and two side tubes connected to both respective ends in the single axis direction of the arc tube, the arc tube having the pair of the electrodes inside; two lead rods supporting the pair of the electrodes respectively; a support member that has no conductivity and that is inside at least one of the two side tubes to support the corresponding lead rod; a conductive member being inside the side tube that has the support member inside, the conductive member being in contact with the corresponding lead rod; and a trigger member being outside the bulb and being disposed around an outer periphery of the conductive member.

8 Claims, 6 Drawing Sheets

DISCHARGE LAMP

CROSS-REFERENCE TO RELATED APPLICATIONS

This application is a Continuation of U.S. patent application Ser. No. 19/169,878 filed Apr. 3, 2025, the entire content of which is incorporated herein by reference.

BACKGROUND OF THE INVENTION

Field of the Invention

The present invention relates to a discharge lamp.

Description of the Related Art

Super-high pressure mercury lamps have been known as a light source that is used in exposure devices for manufacturing products such as semiconductors, display devices, or wiring boards. The super-high pressure mercury lamp includes an arc tube in which an anode and a cathode are disposed so as to face each other for electric discharging and mercury is sealed as a light emitting gas. The anode and the cathode are supported by respective lead rods, and the lead rods are supported by a pair of side tubes connected to both ends of the arc tube. When a voltage is applied between the electrodes, arcing occurs in a vapor of the mercury inside the arc tube, and the super-high pressure mercury lamp emits light.

One of indicators of the performance of discharge lamps such as super-high pressure mercury lamps is lighting startability. Lighting startability is a degree of shortness of time necessary for a discharge lamp to actually light up from the instant at which electric power is supplied to the discharge lamp. Good lighting startability represents a small amount of time necessary for a discharge lamp to actually light up from the instant at which electric power is supplied to the discharge lamp. In the present specification, the lighting startability of a discharge lamp is simply expressed as "startability".

A known method for improving startability is a method using a trigger member. Patent Document 1 discloses a metal halide lamp (a type of discharge lamp) in which a trigger member is wound around a side tube. At a time of lamp start (lighting start), electric power is applied to the trigger member, and a dielectric barrier discharge is generated inside a bulb to help the discharge lamp to light up. In other words, it is known that the trigger member is disposed to improve the startability.

PRIOR ART DOCUMENT

Patent Document

Patent Document 1: JP-A-H9-97591

SUMMARY OF THE INVENTION

When an amount of accumulated lighting time of a discharge lamp gets large and as the discharge lamp is approaching the end of its life, the startability deteriorates. When the startability deteriorates, it may take the discharge lamp an amount of time to light up, or the discharge lamp may not light up. If the time necessary for the discharge lamp to light up exceeds a permissible time or if the discharge lamp does not light up, the discharge lamp is judged to reach the end of its life.

Longer life of discharge lamps is required by the market. An object of the present invention is to provide a discharge lamp the startability of which is less likely to fall even at the end of life and the life of which is longer than the life of conventional discharge lamps.

A discharge lamp according to the present invention includes:

- a pair of electrodes disposed so as to face each other in a single axis direction;
- a bulb that includes an arc tube and two side tubes connected to both respective ends in the single axis direction of the arc tube, the arc tube having the pair of the electrodes inside;
- two lead rods supporting the pair of the electrodes respectively;
- a support member that has no conductivity and that is inside at least one of the two side tubes to support the corresponding lead rod;
- a conductive member being inside the side tube that has the support member inside, the conductive member being in contact with the corresponding lead rod; and
- a trigger member being outside the bulb and being disposed around an outer periphery of the conductive member.

Without a conductive member, a dielectric barrier discharge needs to be generated in an area of a large distance between a lead rod and a trigger member. However, the discharge lamp includes the conductive member and the trigger member around the outer periphery of the conductive member. Since the trigger member is disposed around the outer periphery of the conductive member, a dielectric barrier discharge can be generated in an area of a small distance between the conductive member and the trigger member. In the present specification, a "trigger member disposed around the outer periphery of a conductive member" indicates that the trigger member is disposed at a place such that starting power can be given to the conductive member through a dielectric barrier discharge. The dielectric barrier discharge promotes an electric discharge accompanied by light emission between the pair of the electrodes (an anode and a cathode). This improves dielectric breakdown performance and increases the probability of the discharge lamp lighting up.

The conductive member may be in the shape of a thin sheet. The conductive member may, for example, have a thickness of 0.4 mm or less in the single axis direction. The thickness of the conductive member in the single axis direction may be 0.1 mm or less. With a decrease in thickness of the conductive member, an electric field intensity of the dielectric barrier discharge increases. This, as a result, facilitates the generation of an electric discharge accompanied by light emission between the pair of the electrodes.

The discharge lamp may include a fastening member to fix the conductive member, and

- the conductive member may be clamped between the support member and the fastening member. This restrains a misalignment of the conductive member and enables stable use of the discharge lamp.

The fastening member may be supported by the corresponding lead rod and may be made of a conductive material to electrically connect the corresponding lead rod to the conductive member. The fastening member made of a conductive material ensures conduction between the conductive member and the lead rod.

The discharge lamp may include a conductive film being on an outer surface of the bulb and being positioned between the conductive member and the trigger member. As described in detail later, the conductive film functions as a thermal insulation film to heat or thermally insulate a fluid (for example, mercury) with which the discharge lamp is filled. In addition to that, if the conductive film is positioned between the conductive member and the trigger member, the conductive film performs the action of facilitating the generation of a dielectric barrier discharge.

A distance between the conductive member and the trigger member may be 25 mm or less. This increases the dielectric breakdown probability between the anode and the cathode and promotes an electric discharge between the pair of the electrodes.

A distance between a tip of the electrode supported by the corresponding lead rod in contact with the conductive member and the conductive member may be 220 mm or less. If the conductive member comes closer to the tip of the electrode, a place at which a dielectric barrier discharge is generated and a place at which an electric discharge is generated between the pair of the electrodes come closer to each other. This improves dielectric breakdown performance and promotes an electric discharge between the pair of the electrodes.

The conductive member may include a projection projecting out in a radial direction along a cross section of the conductive member orthogonal to the single axis direction. The conductive member that includes the projection causes the electric field intensity of the dielectric barrier discharge to increase. This, as a result, facilitates the generation of an electric discharge accompanied by light emission between the pair of the electrodes.

This makes it possible to provide a discharge lamp the startability of which is less likely to fall even at the end of life and the life of which is longer than the life of conventional discharge lamps.

DETAILED DESCRIPTION OF THE PREFERRED EMBODIMENTS

With reference to the drawings, an embodiment of the above-described discharge lamp and modifications thereof will now be described. It should be noted that the drawings disclosed herein merely show schematic illustrations. In other words, the dimensional ratios on the drawings do not necessarily reflect the actual dimensional ratios, and the dimensional ratios are not necessarily the same between the drawings.

Hereinafter, description will be made with reference to an XYZ coordinate system as appropriate. When it is necessary to make a distinction between positive and negative to express a direction herein, the direction is described with a positive or negative sign, such as "+X direction" or "−X direction". When it is not necessary to make a distinction between positive and negative to express a direction, the direction is simply described as "X direction". That is, when the direction is simply described as "X direction" herein, both "+X direction" and "−X direction" are included. The same applies to the Y direction and the Z direction. −Z direction refers to downward in a vertical direction (a direction of gravity).

[Overall Structure of Lamp]

Figure 1:
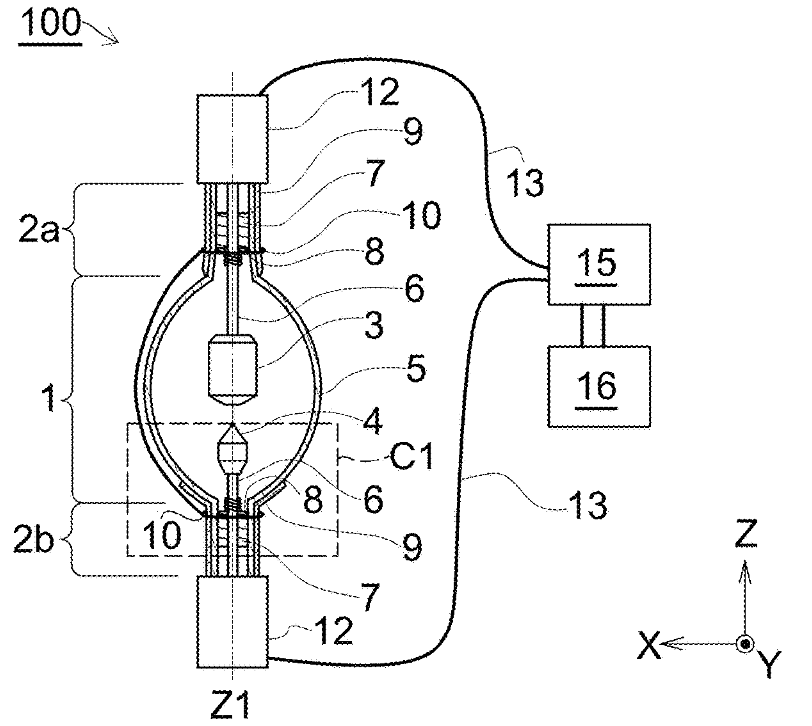
FIG. 1 is a diagram showing an embodiment of a discharge lamp.

FIG. 1 shows a super-high pressure mercury lamp 100 of a short-arc type (hereinafter referred to as a "lamp 100"), an embodiment of a discharge lamp of the present invention. The lamp 100 includes an arc tube 1, a first side tube 2*a* connected to one end in a tube axis direction (a Z direction) of the arc tube 1, a second side tube 2*b* connected to an other end in the tube axis direction of the arc tube 1, an anode 3 and a cathode 4 that are disposed inside the arc tube 1 so as to be separated from and face each other in the Z direction, lead rods 6 connected to the anode 3 and the cathode 4 respectively, and bases 12 connected electrically to the respective lead rods 6. The arc tube 1, the first side tube 2*a*, and the second side tube 2*b* constitute a bulb 5 forming one sealed space. The bulb 5 (the arc tube 1, the first side tube 2*a*, and the second side tube 2*b*) is made of quartz. For the discharge lamp of the present embodiment, when the lamp 100 is lit, the lamp 100 is disposed such that the anode 3 is positioned above the cathode 4.

The lead rod 6 connected to the anode 3 is supported inside the first side tube 2*a* by a support member 7 that has no conductivity. The support member 7 is inscribed at least partially in the first side tube 2*a* and is thereby fixed. In the present embodiment, the support member 7 is in the form of a cylinder that has a through-hole at its center. The lead rod 6 is inserted into the through-hole. The bulb 5, the anode 3, the cathode 4, the lead rod 6, and the support member 7 each have a rotationally symmetric shape centered on a Z1 axis. The shapes of the bulb 5, the anode 3, the cathode 4, and the support member 7 are not limited to those illustrated in the present embodiment but may be other shapes. The anode 3, the cathode 4, and the lead rod 6 are made of a material containing a high melting point metal such as tungsten.

In the preset embodiment, the support member 7 is made of quartz, for example. As described above, the first side tube 2*a* is made of quartz. When the support member 7 and the first side tube 2*a* are made of the same material, the support member 7 and the first side tube 2*a* have a shared thermal expansion coefficient. Hence, this is preferable because thermal distortion between the support member 7 and the first side tube 2*a* is less likely to occur with a change in temperature of the lamp 100. Similarly, the support member 7 that is inside the second side tube 2*b* to support the lead rod 6 connected to the cathode 4 is made of quartz. However, the material for the support members 7 may differ from the material for the side tubes (2*a*, 2*b*).

The two bases 12 are electrically connected to an ignitor 15 through a power supply line 13. The ignitor 15 is electrically connected to a power source 16 for the lamp 100.

At the time of start (when the lamp 100 starts to light up), the ignitor 15 applies a starting pulse voltage to a pair of the electrodes (3, 4). However, in the present specification, the power supply line 13, the ignitor 15, and the power source 16 are not components of the lamp 100.

Mercury is sealed inside the bulb 5. When a voltage is applied between the cathode 4 and the anode 3, the mercury is heated, and the sealed space is filled with a vapor of the mercury. Arcing occurs in the mercury vapor between the cathode 4 and the anode 3, and the lamp 100 emits light. As described above, the lamp 100 of the present embodiment is a super-high pressure mercury lamp of a short-arc type. In the present specification, the "short-arc type" lamp is a lamp in which the anode 3 and the cathode 4 are disposed so as to face each other through a gap of 35 mm or less (a value at normal temperature without thermal expansion). In the present specification, the "super-high pressure" indicates that the space inside the arc tube is at a pressure ranging from $5\times10^5$ Pa to $2\times10^7$ Pa when the lamp 100 is lit.

The lamp 100 includes a trigger member 10 outside the bulb 5. The trigger member 10 is outside the bulb 5 and is disposed around an outer periphery of a conductive member 8. In the present embodiment, the trigger member 10 is a flexible wire member referred to as a "trigger wire". The trigger members 10 are wound around the first side tube 2*a* and the second side tube 2*b* so as to form respective rings. In the present embodiment, the ring-shaped trigger members 10 are positioned around the outer peripheries of the respective conductive members 8. The trigger member 10 surrounding the first side tube 2*a* and the trigger member 10 surrounding the second side tube 2*b* are connected to each other by a lead wire. For instance, when a dielectric barrier discharge is generated between one of the trigger members 10 and the conductive member 8 near the one trigger member 10, a voltage is applied to the one trigger member 10, and a consequent current is conducted through the lead wire, causing a dielectric barrier discharge to be generated between the other trigger member 10 and the conductive member 8 near the other trigger member 10. As a result, the trigger members 10 function as an auxiliary line to generate a dielectric barrier discharge in the lamp 100 and promote arcing between the anode 3 and the cathode 4.

In this way, the trigger member 10 is not connected by a lead wire physically connected to the ignitor 15, but is electrically connected via a dielectric barrier discharge through one of the lead rods 6 and the conductive member 8. Consequently, a voltage is applied to the trigger member 10. In the present embodiment, the ignitor 15 is built on a direct-current system and supplies direct-current power to the trigger members 10. The trigger members 10 function as an auxiliary line to generate a dielectric barrier discharge in the lamp 100 and promote arcing between the anode 3 and the cathode 4. At the time of start (when the lamp 100 starts to light up), the ignitor 15 applies a starting pulse voltage to the trigger members 10. This generates a dielectric barrier discharge in the space inside the bulb 5 near the trigger member 10. The dielectric barrier discharge causes dielectric breakdown between the pair of the electrodes (3, 4) inside the bulb and promotes arcing between the pair of the electrodes (3, 4). This helps the lamp 100 to start working (start lighting up).

Preferably, the trigger member 10 forms a ring on an XY plane flush with the conductive member 8 to produce the effect of helping the lamp to start working. However, an element that functions as the trigger member 10 is not limited to a wire that forms a ring on the XY plane flush with the conductive member 8. The trigger member 10 may, for example, be a wire disposed at a place that is slightly shifted in the Z direction from the XY plane flush with the conductive member 8. The trigger member 10 is preferably disposed around the outer periphery of the conductive member 8 such that starting power can be given to the conductive member 8 through a dielectric barrier discharge. As in a configuration of FIG. 7B described later, although the ring-shaped trigger member 10 is wound at a place separated in the tube axis direction from the conductive member 8, a portion 10*w* of a lead wire connected to the trigger member 10 is positioned at the outer periphery of the conductive member 8, and thus the portion 10*w* of the lead wire serves as the trigger member 10. The trigger member 10 may not have a wire shape. The trigger member may, for example, have a belt shape or a rod shape.

The lamp 100 includes a thermal insulation film 9 on an outer surface of the bulb 5. The thermal insulation film 9 is a film disposed to promote evaporation of the mercury sealed inside the bulb 5. In the present embodiment, the film is formed in an area on the first side tube 2*a* and in an area extending from a portion of the arc tube 1 near the second side tube 2*b* to the second side tube 2*b*. In the present embodiment, the thermal insulation film 9 is a metal film referred to as "liquid gold" and has conductivity. The thermal insulation film 9 will be described in detail later.

The lamp 100 has the conductive members 8 inside the first side tube 2*a* and inside the second side tube 2*b*, respectively. The conductive members 8 are in contact with the respective lead rods 6. In the present embodiment, the conductive member 8 is disposed so as to be in contact with an end face of the support member 7 adjacent to the arc tube 1. Action and effect of the conductive members 8 will be described.

[Action and Effect, and Details of Conductive Member]

Figure 2:
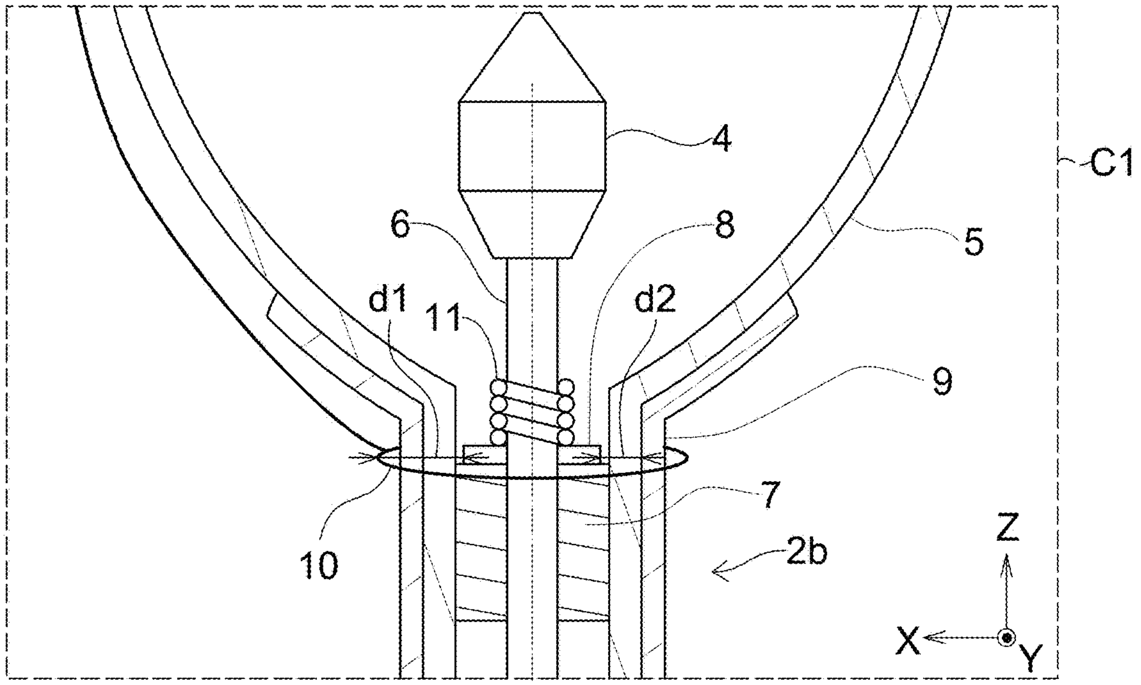
FIG. 2 is an enlarged view of a principal part of FIG. 1.
Figure 3:
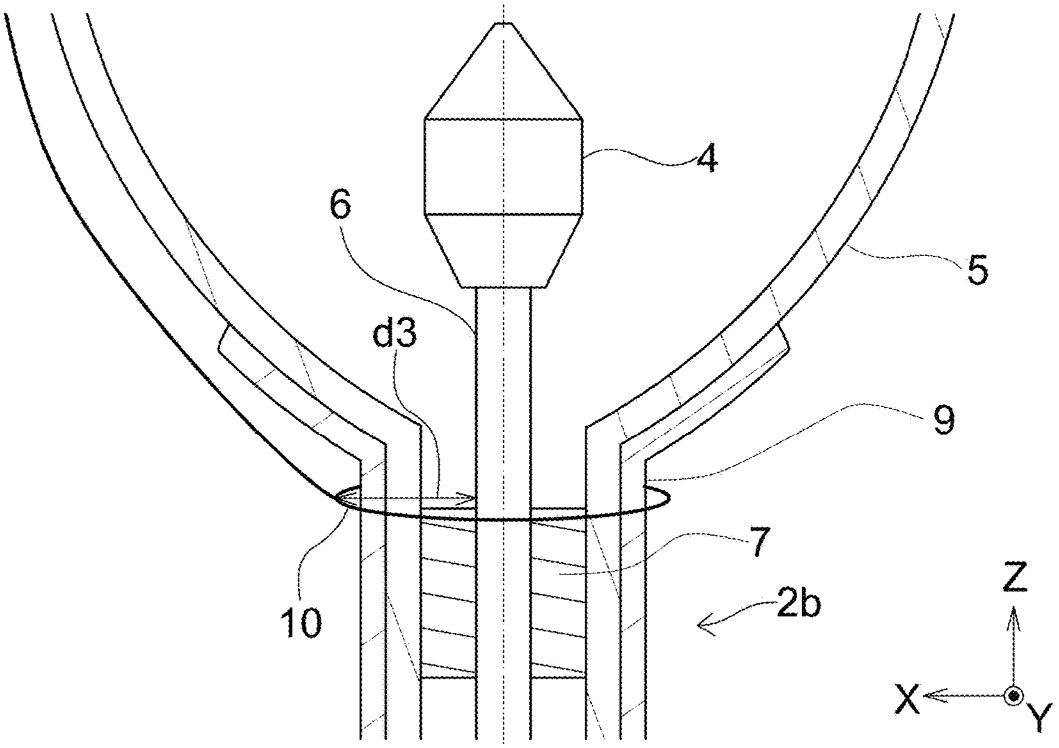
FIG. 3 is a diagram showing a comparative embodiment of the discharge lamp.

By comparison between FIGS. 2 and 3, action and effect of the conductive members 8 included in the lamp 100 will be described. FIG. 2 is an enlarged view of a C1 region in FIG. 1. In the C1 region, the cathode 4, a portion of the lead rod 6 connected to the cathode 4, the support member 7 supporting the lead rod 6, the conductive member 8, and a portion of the bulb 5 that is a portion of the arc tube 1 and a portion of the second side tube 2*b* are shown. Regarding a discharge lamp in a comparative embodiment, FIG. 3 shows a region corresponding to the C1 region. The discharge lamp in the comparative embodiment does not include the conductive members 8.

In FIG. 2, a distance between the conductive member 8 and the trigger member 10 is indicated by d1. When a pulse voltage is applied to the trigger member 10, a dielectric barrier discharge is generated with the distance d1. In contrast to this, the discharge lamp of the comparative embodiment shown in FIG. 3 does not have the conductive member 8. Thus, this discharge lamp causes a dielectric barrier discharge to be generated with a distance d3 between the lead rod 6 and the trigger member 10. In other words, since the conductive member 8 is disposed, the distance d1 is shorter than the distance d3. This facilitates the generation of a dielectric barrier discharge. Once the generation of a dielectric barrier discharge is facilitated, the generation of dielectric breakdown between the pair of the electrodes (3, 4) is facilitated. This makes it easier for arcing to start. In this way, the conductive member 8 disposed facilitates the generation of a dielectric barrier discharge and improves dielectric breakdown performance. This helps to maintain the startability even at the end of life of the lamp 100, at which the startability is likely to fall, and prolong the life of the lamp 100.

If the thermal insulation film 9 is a conductive film (for example, a metal film), the thermal insulation film 9 can be an electrode for dielectric barrier discharge with the trigger member 10 being put into contact with the thermal insulation film 9. At this time, a distance with which a dielectric barrier discharge is generated is indicated by d2. The distance d2 is shorter than the distance d1. This facilitates the generation of a dielectric barrier discharge and further improves dielectric breakdown performance.

Figure 4:
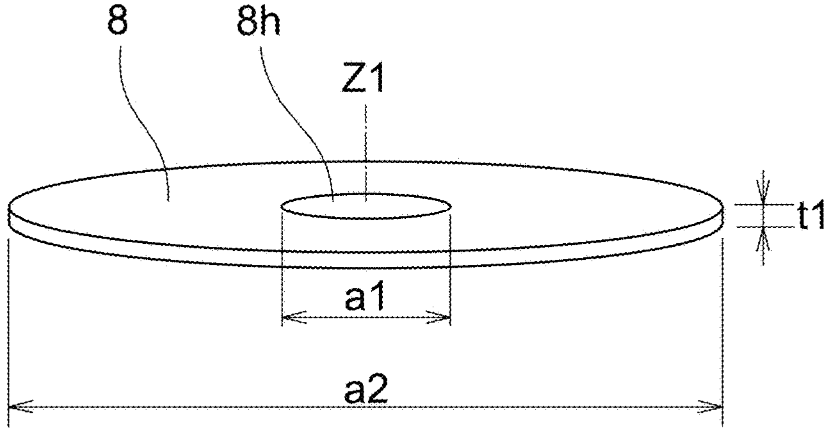
FIG. 4 is a diagram showing a conductive member.

FIG. 4 is a diagram showing only the conductive member 8. The conductive member 8 of the present embodiment has a circular shape as a whole and has a through-hole 8*h*, which is centered on the Z1 axis, at its center. A thickness t1 of the conductive member 8 along a Z axis is small. The conductive member 8 may have a sheet shape. The thickness t1 may, for example, be 0.4 mm or less and may be 0.1 mm or less. With a decrease in thickness t1, an electric field intensity of the dielectric barrier discharge increases.

Preferably, an inner diameter a1 of the through-hole 8*h* in the conductive member 8 is equal to or slightly smaller than an outer diameter of the lead rod 6. This ensures that the conductive member 8 is reliably in contact with the lead rod 6.

Preferably, an outer diameter a2 of the conductive member 8 is smaller than an inner diameter of the second side tube 2*b*. This, as shown in FIG. 2, provides a gap between the conductive member 8 and the second side tube 2*b* (the bulb 5). This ensures that the conductive member 8 is not put into contact with an inner wall of the second side tube 2*b* even when the lamp 100 is lit. A thermal expansion coefficient of the conductive member 8 differs from a thermal expansion coefficient of the second side tube 2*b*. Thus, the conductive member 8 or the second side tube 2*b* may be warped if the conductive member 8 that is thermally expanded is put into contact with the inner wall of the second side tube 2*b*. However, when the conductive member 8 is not put into contact with the inner wall of the second side tube 2*b*, each of the conductive member 8 and the second side tube 2*b* is not warped because they are not put into contact with each other.

The conductive member 8 is made of a metal material that has conductivity. Preferably, the conductive member 8 is made of a high melting point material that does not melt even when the lamp 100 is lit. The conductive member 8 may, for example, be a molybdenum-based material or a tungsten-based material.

As shown in FIG. 1, the conductive member 8 may also be disposed between the anode 3 and the support member 7 supporting the lead rod 6 for the anode 3 and have a shortened distance from the trigger member 10.

Figure 5:
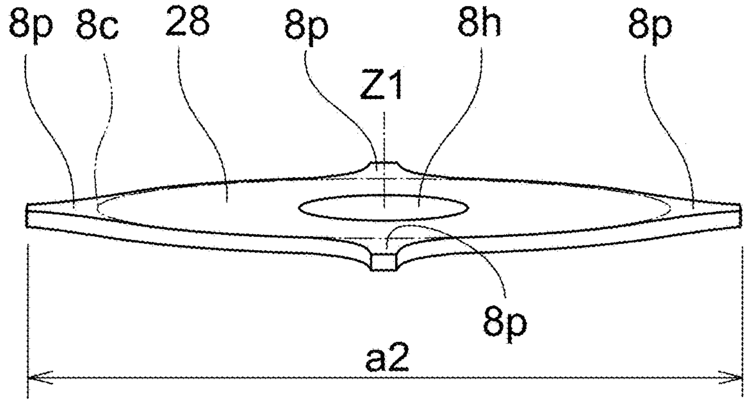
FIG. 5 is a diagram showing a modification of the conductive member.

The shape of the conductive member 8 is not particularly limited. FIG. 5 shows a modification of the conductive member 8. A conductive member 28 shown in FIG. 5 has a circular contour 8*c* as a whole, but has a plurality of projections 8*p* projecting in a radial direction from the contour 8*c*. With the projections 8*p*, the electric field intensity of the dielectric barrier discharge increases. In FIG. 5, the four projections 8*p* are arranged at intervals of a constant angle (90 degrees) when viewed along the Z1 axis. This facilitates the generation of a dielectric barrier discharge in each direction.

[Fastening Member]

The conductive member 8 is fixed with a fastening member 11. In the present embodiment, as shown in FIG. 2, the fastening member 11 is in the shape of a coil wound around the lead rod 6. One end of the coil-shaped fastening member 11 is fixed to the lead rod 6. This ensures that the fastening member 11 is supported by the lead rod 6. An other end of the fastening member 11 presses the conductive member 8 against an end face of the support member 7 adjacent to the cathode 4. The conductive member 8 is clamped between the fastening member 11 and the support member 7. More preferably, the fastening member 11 is made from a member that has conductivity. This enables the fastening member 11 to function as a conductive path between the lead rod 6 and the conductive member 8.

[Thermal Insulation Film]

The thermal insulation film 9 will now be described in detail. The thermal insulation film 9 is positioned between the conductive member 8 and the trigger member 10. In the present embodiment, as described above, the lamp 100 is disposed such that the anode 3 is positioned above the cathode 4. Thus, the liquid mercury that has not evaporated accumulates on the support member 7 supporting the lead rod 6 connected to the cathode 4. Part of the light generated by the lamp 100 is reflected off the thermal insulation film 9 to the mercury accumulating on the support member 7, and the reflected light heats the mercury. Evaporation of the mercury is thus promoted to increase arcing and increase an amount of the emitted light.

In this way, the thermal insulation film 9 is a film disposed to promote mercury evaporation action. As described above, if the thermal insulation film 9 is made of a conductive material, new action, i.e., an electrode for generating a dielectric barrier discharge, can be added where the thermal insulation film 9 is an electrode for dielectric barrier discharge. However, the thermal insulation film 9 may be a film that does not have conductivity or a film other than metal. The trigger member 10 may not be electrically connected to the thermal insulation film 9.

Figure 6:
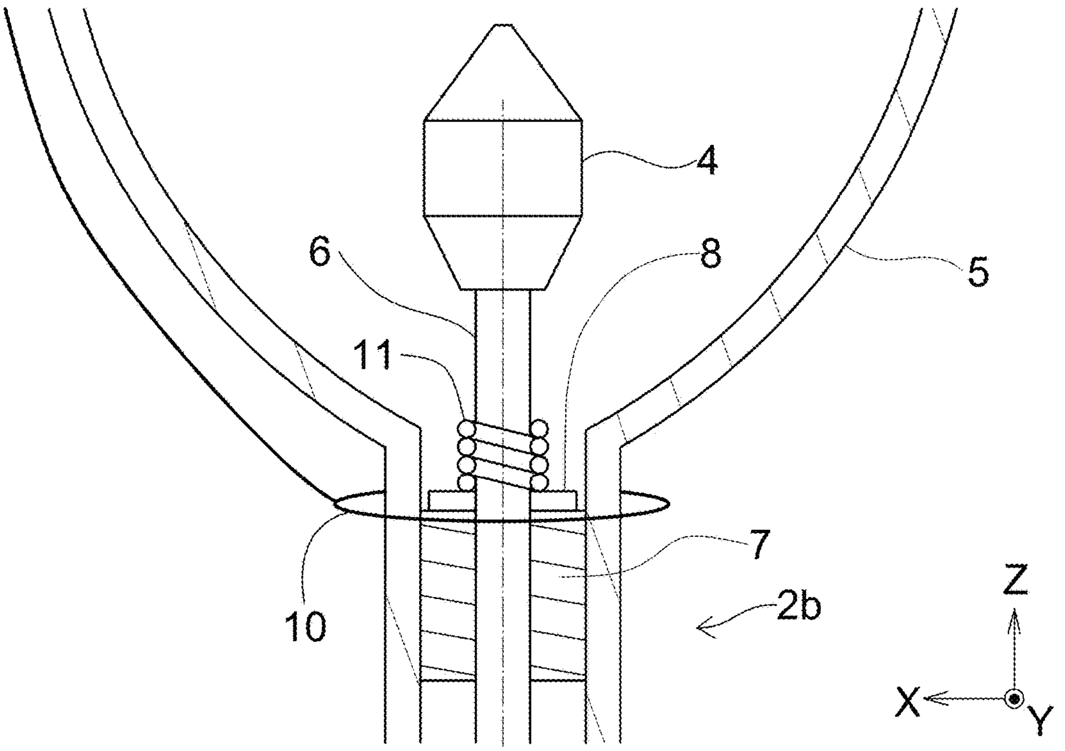
FIG. 6 is an enlarged view of a principal part of a modification of the discharge lamp.

FIG. 6 is an enlarged view of a principal part of a modification of the lamp 100. This discharge lamp does not include the thermal insulation film 9. Even if the discharge lamp does not include the thermal insulation film 9, the trigger member 10 disposed provides the action of generating a dielectric barrier discharge. Hence, the thermal insulation film 9 is an additional component in the present invention.

The embodiment of the lamp 100 and the modifications thereof have been described above. The present invention is not limited to the above embodiment, and various changes or modifications may be made to the above embodiment without departing from the spirit of the present invention. Although not shown in FIG. 1, the bulb 5 of the lamp 100 may include a sealing portion that is a trace of the exhaust pipe attached to the lamp at the time of manufacturing the lamp. The sealing portion has a shape of the exhaust pipe that is sealed inside and that projects to the outside from the arc tube 1, for example.

The discharge lamp to which the present invention is applied is not limited to the super-high pressure mercury lamp of the short-arc type described above. The discharge lamp may, for example, be a super-high pressure mercury lamp of a long-arc type, a metal halide lamp that uses emission of light by a vapor of a metal other than mercury, or a flash lamp (e.g., a xenon electronic-flash lamp).

[First Experiment]

An experiment below (a first experiment) was conducted to verify an effect of a discharge lamp produced with or without a conductive member 8 and by a difference in the way of disposing the conductive member 8. The first experiment was conducted using experimental apparatuses that each included a discharge device 200 imitating the lamp 100. FIGS. 7A to 7D show the experimental apparatuses. As shown in FIGS. 7A to 7D, all the experimental apparatuses each included a discharge device 200, an ignitor 15 (a DC ignitor of a direct current type) capable of changing output, and a power source 16. The discharge device 200 included, common to FIGS. 7A to 7D, an anode 3 similar in shape to the anode 3 included in the lamp 100, a lead rod 6 connected to the anode 3, a cathode 4 made by sharpening a tip of a lead rod 6, a cylindrical bulb 5 having a constant diameter, non-conductive support members 7, and wire-shaped trigger members 10. Argon gas was sealed in the cylindrical bulb 5.

Figure 7A:
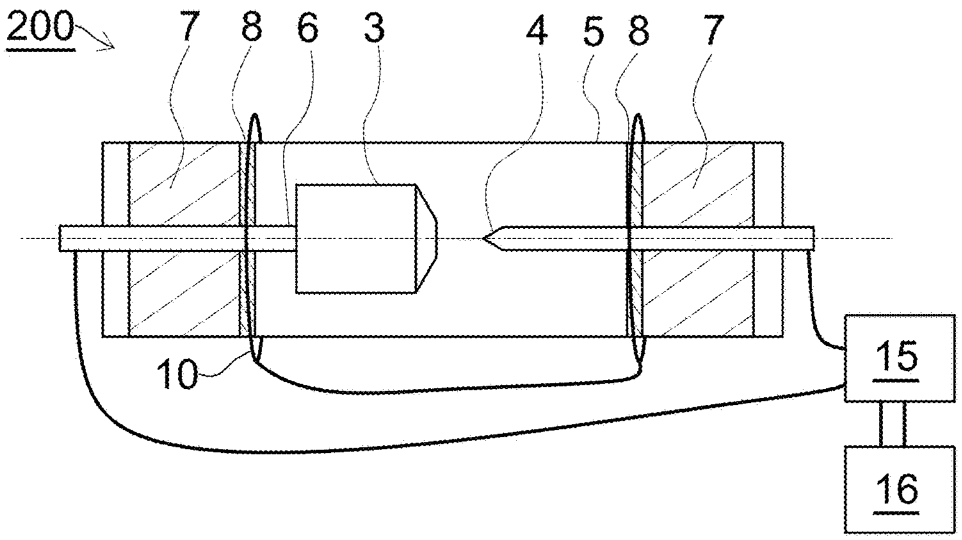
FIG. 7A is a diagram illustrating a testing apparatus S1 for a discharge lamp.

A testing apparatus S1 is a discharge device 200 shown in FIG. 7A. In the testing apparatus S1, each conductive member 8 was fixed to an end face of the support member 7 adjacent to the anode. The trigger members 10 were disposed so as to overlap the respective conductive members 8 in the tube axis direction of the discharge device 200.

Figure 7B:
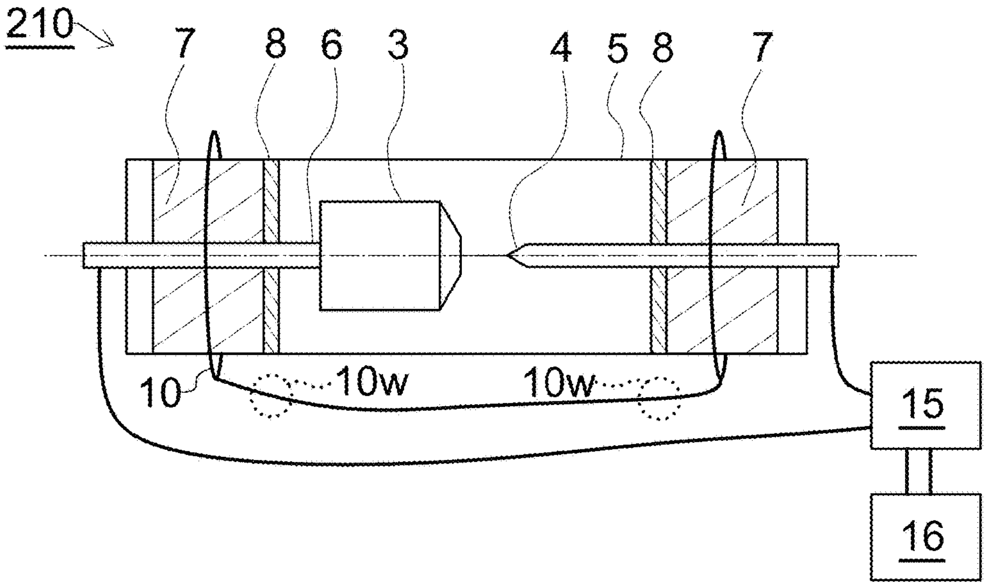
FIG. 7B is a diagram illustrating a testing apparatus S2 for a discharge lamp.

A testing apparatus S2 is a discharge device 210 shown in FIG. 7B. In the testing apparatus S2, each conductive member 8 was fixed to an end face of the support member 7 adjacent to the anode. The trigger members 10 were disposed so as not to overlap the respective conductive members 8 in the tube axis direction of the discharge device 210 and were disposed at places remoter from the two electrodes (3, 4) than the respective conductive members 8.

Figure 7C:
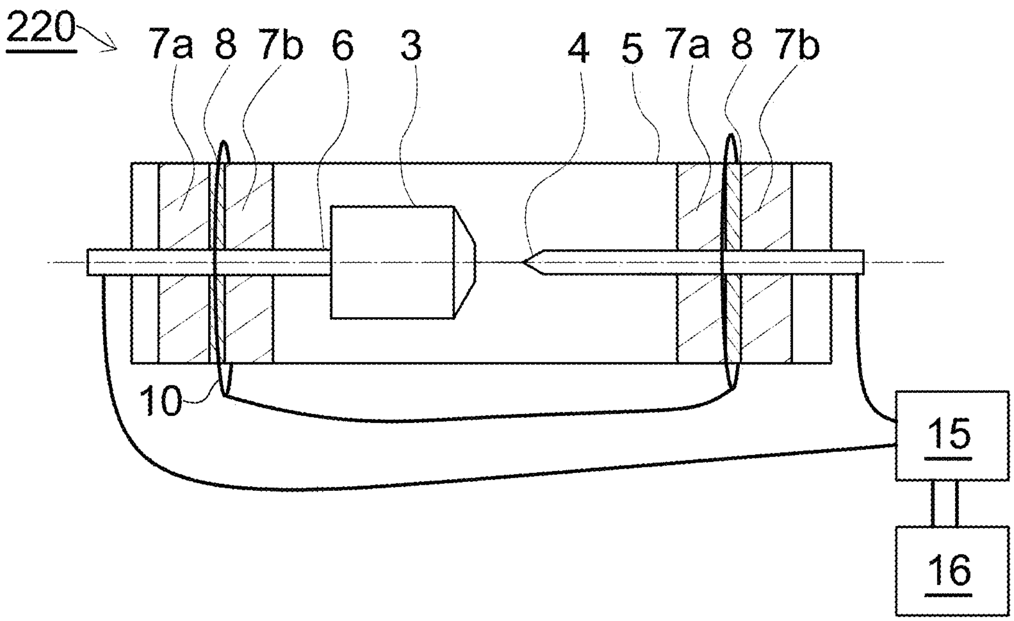
FIG. 7C is a diagram illustrating a testing apparatus S3 for a discharge lamp.

A testing apparatus S3 is a discharge device 220 shown in FIG. 7C. In the testing apparatus S3, each conductive member 8 was fixed between two divided support members (7*a*, 7*b*). The support members 7*a* and 7*b* had a common thickness in the tube axis direction of the discharge device 220. The trigger members 10 were disposed so as to overlap the respective conductive members 8 in the tube axis direction of the discharge device 220. The places of the trigger members 10 of the testing apparatus S3 in the tube axis direction of the discharge device 220 were identical to the places of the trigger members 10 of the testing apparatus S2 in the tube axis direction of the discharge device 210.

Figure 7D:
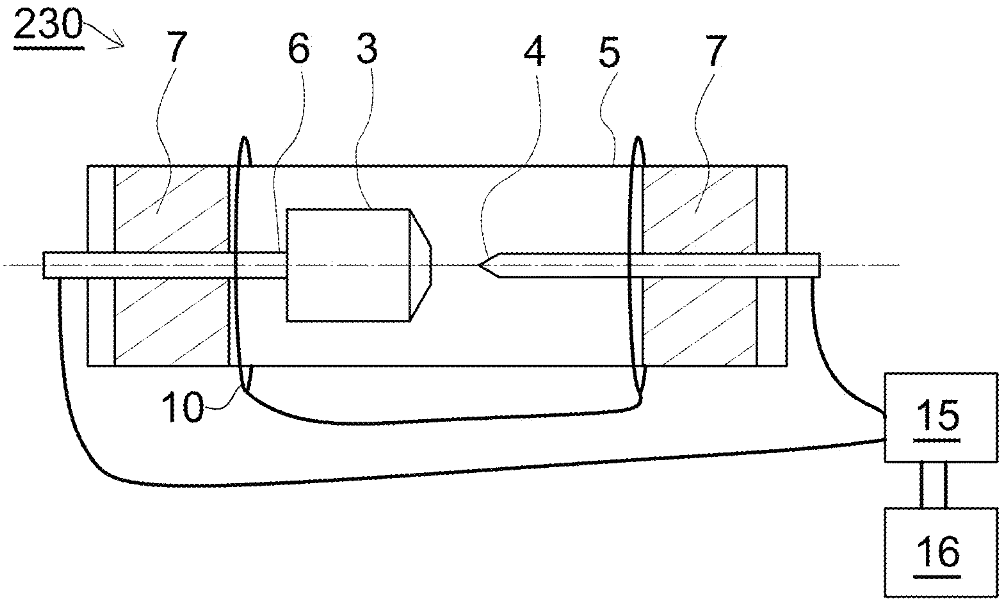
FIG. 7D is a diagram illustrating a testing apparatus S4 for a discharge lamp.

A testing apparatus S4 is a discharge device 230 shown in FIG. 7D. The discharge device 230 did not include conductive members 8. The places of the trigger members 10 of the testing apparatus S4 in the tube axis direction of the discharge device 230 were identical to the places of the trigger members 10 of the testing apparatus S1 in the tube axis direction of the discharge device 200.

With regard to the testing apparatuses S1 to S4, the experiment was conducted to determine dielectric breakdown probabilities of the discharge devices (200, 210, 220, 230) of the testing apparatuses by changing an output voltage of the ignitor 15. Dielectric breakdown means that insulation between the electrodes in the discharge device is broken and an electric discharge starts, and in the case of a discharge lamp, means that insulation between the electrodes in the discharge device is broken, an electric discharge starts, and the discharge lamp lights up. A high dielectric breakdown probability with a low output voltage of the ignitor 15 indicates that the discharge device (the discharge lamp) has excellent startability. Table 1 shows results of the experiment.

TABLE 1

| TESTING APPARATUS NO. | DIELECTRIC BREAKDOWN PROBABILITY 9 kV | 12 kV | 16 kV | 19 kV | 26 kV | EVALUATION |
|---|---|---|---|---|---|---|
| S1 | 7/10 | 10/10 | | | | S |
| S2 | 1/10 | 8/10 | 10/10 | | | A |
| S3 | 0/10 | 8/10 | 10/10 | | | A |
| S4 | 0/10 | 0/10 | 0/10 | 5/10 | 10/10 | B |

In Table 1, 9 kV, 12 kV, 16 kV, 19 kV, and 26 kV represent the output voltages of the ignitor 15. The numerator "10" for the dielectric breakdown probabilities represents a number of times (10 times) at which electric power was supplied from the ignitor 15. Each numerator value represents a number of occurrences of dielectric breakdown (i.e., the number of times at which the discharge lamp was lit) out of 10 times at which electric power was supplied. For instance, when the output voltage of the ignitor 15 for the testing apparatus S1 was 9 kV, the dielectric breakdown probability indicates that the discharge device reached dielectric breakdown and an electric discharge started at 7 out of 10 times, whereas the discharge device did not reach dielectric breakdown and an electric discharge did not start at 3 out of 10 times. Meanwhile, when the output voltage of the ignitor 15 for the testing apparatus S1 was 12 kV, the dielectric breakdown probability indicates that the discharge device reached dielectric breakdown and an electric discharge started at 10 out of 10 times.

As described above, with a decrease in the output voltage of the ignitor 15 that enables dielectric breakdown, the lamp displays a higher level of startability excellence. Based on the dielectric breakdown probabilities obtained by ignitor 15 output voltage, the startability of the testing apparatuses S1 to S4 was graded according to three ranks S, A, and B in order of excellence. The testing apparatus S1 was graded a highest evaluation level of S. The testing apparatuses S2 and S3 were graded a second highest evaluation level of A. The testing apparatus S4 was graded a lowest evaluation level of B.

By comparing the testing apparatuses S1 and S4, the results prove that the discharge device with a conductive member 8 provides improved startability (graded up from B to S).

By comparing the testing apparatuses S1 and S2 and comparing the testing apparatuses S1 and S3, the results prove that with both the trigger members 10 and the conductive members 8 positioned as close as possible to the electrodes, the discharge device provides improved startability (graded up from A to S).

In the testing apparatus S2, the trigger member 10 was wound at a place separated from the conductive member 8. However, a portion 10*w* of a lead wire running from the wound trigger member 10 was positioned at the outer periphery of the conductive member 8 (refer to FIG. 7B). Even in this configuration, when a pulse voltage from the ignitor 15 is applied, the portion 10*w* of the lead wire functions as a trigger member 10, and a dielectric barrier discharge is generated with a distance between the conductive member 8 and the portion 10*w* of the lead wire. Hence, the dielectric barrier discharge causes dielectric breakdown between the pair of the electrodes (3, 4) inside the bulb and is effective in promoting arcing between the pair of the electrodes (3, 4).

[Second Experiment]

Figure 8:
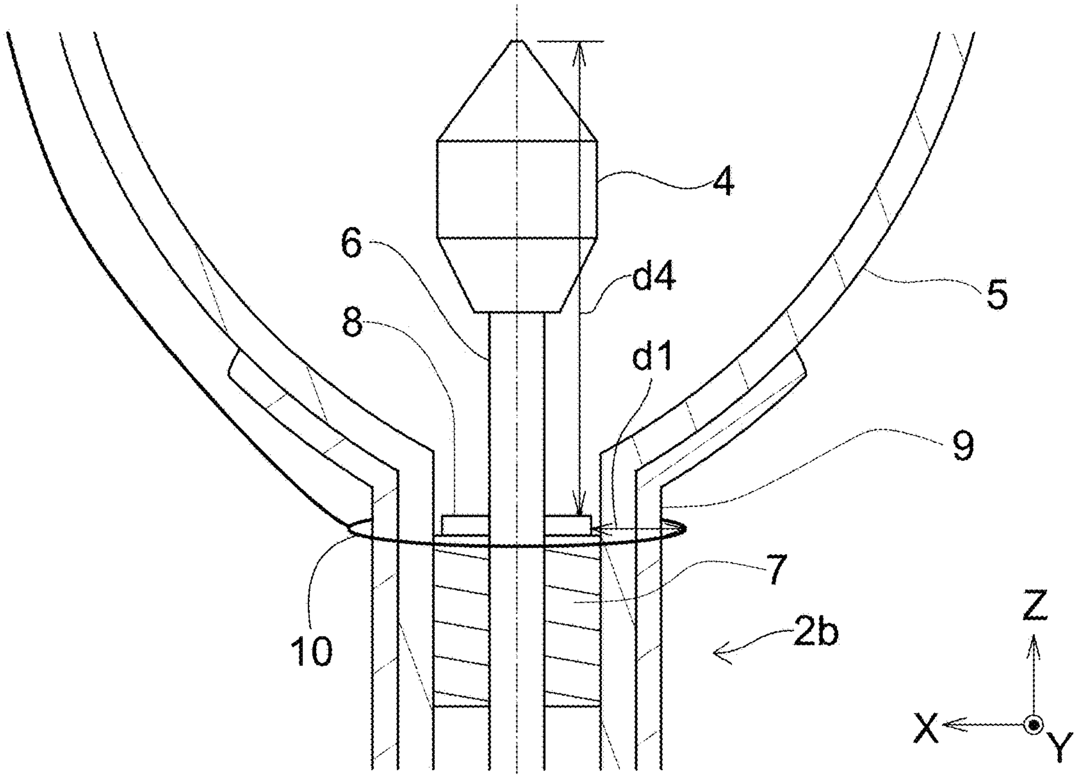
FIG. 8 is an enlarged view of a principal part of a discharge lamp.

Next, with a lamp 100, an experiment (a second experiment) was conducted to determine how the dielectric breakdown probability changes by a relationship of a distance d1 to a distance d4, where the distance d1 was between a conductive member 8 and a trigger member 10, and the distance d4 was between a tip of a cathode 4 and an end face of the conductive member adjacent to the cathode 4. The distance d1 and the distance d4 are shown in FIG. 8, which is an enlarged view of a principal part of the lamp 100. Testing apparatuses with different distances d1 were made by changing dimensions or a shape of the conductive member 8. The testing apparatuses with different distances d4 were made by adjusting a disposition of the cathode 4 and a support member 7 in the Z direction.

In the second experiment, the ignitor output for all the testing apparatuses was standardized at 22 kV. Specifically, the numerator "10" for the dielectric breakdown probabilities represents a number of times (10 times) at which electric power was supplied from the ignitor 15. Each numerator value represents a number of occurrences of dielectric breakdown (i.e., the number of times at which the discharge lamp was lit) out of 10 times at which electric power was supplied.

TABLE 2

| | d1 (mm) | d4 (mm) | DIELECTRIC BREAKDOWN PROBABILITY | EVALUATION |
|---|---|---|---|---|
| S11 | 5 | 100 | 10/10 | S |
| S12 | 5 | 220 | 8/10 | A |
| S13 | 25 | 100 | 7/10 | A |
| S14 | 5 | 250 | 2/10 | B |
| S15 | 35 | 100 | 1/10 | B |

A testing apparatus with a higher dielectric breakdown probability is a lamp that displays a higher level of startability excellence. Based on the dielectric breakdown probabilities, the startability of the testing apparatuses S11 to S15 was graded according to three ranks S, A, and B in order of excellence. By comparing the testing apparatuses S11, S13, and S15, the results prove that the lamp displays a higher level of startability excellence with a decrease in distance d1. Specifically, the results prove that the distance d1 is preferably 25 mm or less so that the lamp is graded A or higher and that the distance d1 is more preferably 5 mm or less so that the lamp is graded S. By comparing the testing apparatuses S11, S12, and S14, the results prove that the lamp displays a higher level of startability excellence with a decrease in distance d4. The results prove that the distance d4 is preferably 220 mm or less so that the lamp is graded A or higher and that the distance d4 is more preferably 100 mm or less so that the lamp is graded S.

Therefore, it is considered that an increase in electric field intensity by the dielectric barrier discharge is more likely to affect arching between the anode 3 and the cathode 4 with a decrease in distance between the tip of the electrode (e.g., the cathode 4) supported by the lead rod 6 in contact with the conductive member 8 and the end face of the conductive member 8 adjacent to the cathode 4, i.e., a proximal end of the conductive member 8. The distance between the tip of the electrode supported by the lead rod 6 in contact with the conductive member 8 and the proximal end, which is the end face of the conductive member 8 adjacent to the cathode 4, is preferably 220 mm or less and more preferably 100 mm or less.

Preferably, the distance d1 between the conductive member 8 and the trigger member 10 is as small as possible. The distance d1 is preferably 25 mm or less and more preferably 5 mm or less, for example. To have a smaller distance d1, the trigger member 10 and the conductive member 8 are preferably disposed such that the positions of these members in the Z direction coincide with each other. If the trigger member 10 is put into contact with the thermal insulation film 9 which has conductivity, the positions of the trigger member 10 and the conductive member 8 in the Z direction may not coincide with each other since the conductive thermal insulation film 9 has a width in the Z direction.

The distance d1 is greater than a total thickness of the bulb 5 and the thermal insulation film 9. In this respect, it is preferred that the distance d1 be at least 2 mm. If the distance d4 is too small, the conductive member 8 is not disposed in the second side tube 2*b* but is disposed in the arc tube 1 in which the conductive member 8 can extend in the radial direction. If the conductive member 8 is disposed in the arc tube 1, the distance d1 may not be permitted to be made small. Thus, it is preferred that the distance d4 be at least 30 mm.

What is claimed is:

1. A discharge lamp comprising:

a pair of electrodes disposed so as to face each other in a single axis direction;

a bulb that includes an arc tube and two side tubes connected to both respective ends in the single axis direction of the arc tube, the arc tube having the pair of the electrodes inside;

two lead rods supporting the pair of the electrodes respectively;

a support member that has no conductivity and that is inside at least one of the two side tubes to support the corresponding lead rod;

a conductive member being inside the side tube that has the support member inside, the conductive member being in contact with the corresponding lead rod, the conductive member surrounds a circumference surface of the corresponding lead rod in all directions, wherein the conductive member contacts an end face of the support member adjacent to the arc tube; and a trigger member being outside the bulb and being disposed around an outer periphery of the conductive member.

2. The discharge lamp according to claim 1, wherein the conductive member has a thickness of 0.4 mm or less in the single axis direction.

3. The discharge lamp according to claim 1, comprising a fastening member to fix the conductive member, wherein the conductive member is clamped between the support member and the fastening member.

4. The discharge lamp according to claim 3, wherein the fastening member is supported by the corresponding lead rod and is made of a conductive material to electrically connect the corresponding lead rod to the conductive member.

5. The discharge lamp according to claim 1, comprising a conductive film being on an outer surface of the bulb and being positioned between the conductive member and the trigger member.

6. The discharge lamp according to claim 1, wherein a distance between the conductive member and the trigger member is 25 mm or less.

7. The discharge lamp according to claim 1, wherein a distance between a tip of the electrode supported by the corresponding lead rod in contact with the conductive member and the conductive member is 220 mm or less.

8. The discharge lamp according to claim 1, wherein the conductive member includes a projection projecting out in a radial direction along a cross section of the conductive member orthogonal to the single axis direction.

* * * * *